(12) United States Patent
Tang

(10) Patent No.: US 12,502,644 B2  
(45) Date of Patent: Dec. 23, 2025

(54) FORWARD OSMOSIS MEMBRANE AND METHOD OF PREPARING SAME

(71) Applicant: BEIJING BAOSHENGTONG INTERNATIONAL ELECTRIC ENGINEERING TECHNOLOGY CO., LTD., Beijing (CN)

(72) Inventor: Chun Tang, Beijing (CN)

(73) Assignee: BEIJING BAOSHENGTONG INTERNATIONAL ELECTRIC ENGINEERING TECHNOLOGY CO., LTD., Beijing (CN)

(*) Notice: Subject to any disclaimer, the term of this patent is extended or adjusted under 35 U.S.C. 154(b) by 624 days.

(21) Appl. No.: 17/874,076

(22) Filed: Jul. 26, 2022

(65) Prior Publication Data  
US 2023/0072568 A1 Mar. 9, 2023

(30) Foreign Application Priority Data  
Sep. 9, 2021 (CN) .......................... 202111056457.0

(51) Int. Cl.  
*B01D 67/00* (2006.01)  
*B01D 61/00* (2006.01)  
(Continued)

(52) U.S. Cl.  
CPC ....... *B01D 67/0013* (2013.01); *B01D 61/002* (2013.01); *B01D 67/00113* (2022.08);  
(Continued)

(58) Field of Classification Search  
CPC ................ B01D 69/105; B01D 61/002; B01D 67/00113; B01D 67/0013; B01D 67/0083;  
(Continued)

(56) References Cited

FOREIGN PATENT DOCUMENTS

| CN | 103055713 A | 4/2013 |
|---|---|---|
| CN | 103055713 B | * 10/2014 |

(Continued)

OTHER PUBLICATIONS

CN-103055713-B translation (Year: 2014).*

*Primary Examiner* — Jonathan M Peo  
(74) *Attorney, Agent, or Firm* — Cheng-Ju Chiang

(57) ABSTRACT

The present invention is related to an osmosis membrane, specifically to a modified forward osmosis membrane and the method of preparing same. The inventive forward osmosis membrane has a modified membrane structure including a hydrophilic support mesh and a hydrophilic polymer membrane layer mixed antioxidant. The hydrophilic polymer membrane layer with antioxidant not only has high salt rejection, but also ensures high oxidation resistance under a strong oxidation environment, and can be used safely and stably. The inventive oxidation resistant forward osmosis membrane has the advantages of improving the efficiency of purifying and separating water, extending the service life, significantly reducing the operation cost of the forward osmosis membrane system. The inventive forward osmosis membrane can be applied in the industries of treatment of strong oxidation waste water, water purifying, filtration and purification of food and medicine filtering and so on.

12 Claims, 1 Drawing Sheet

(51) Int. Cl.
*B01D 69/02* (2006.01)
*B01D 69/10* (2006.01)
*B01D 71/16* (2006.01)

(52) U.S. Cl.
CPC ......... *B01D 67/0097* (2013.01); *B01D 69/02* (2013.01); *B01D 69/1071* (2022.08); *B01D 71/16* (2013.01); *B01D 2323/02* (2013.01); *B01D 2323/219* (2022.08); *B01D 2325/04* (2013.01); *B01D 2325/30* (2013.01); *B01D 2325/36* (2013.01)

(58) Field of Classification Search
CPC ....................... B01D 67/0088; B01D 67/0097; B01D 69/02; B01D 69/1071; B01D 71/16; B01D 2323/081; B01D 2323/12; B01D 2325/04; B01D 2325/36; B01D 2325/48; B01D 2323/21811; B01D 2323/21813; B01D 67/0079; B01D 69/148; B01D 71/381; B01D 69/10; B01D 69/12; B01D 71/022; B01D 71/024; B01D 71/26; B01D 71/38; B01D 71/42; B01D 71/70; B01D 71/72; Y02A 20/131

See application file for complete search history.

(56) References Cited

FOREIGN PATENT DOCUMENTS

| | | |
|---|---|---|
| CN | 104379243 A | 2/2015 |
| CN | 103785301 B | 8/2016 |

\* cited by examiner

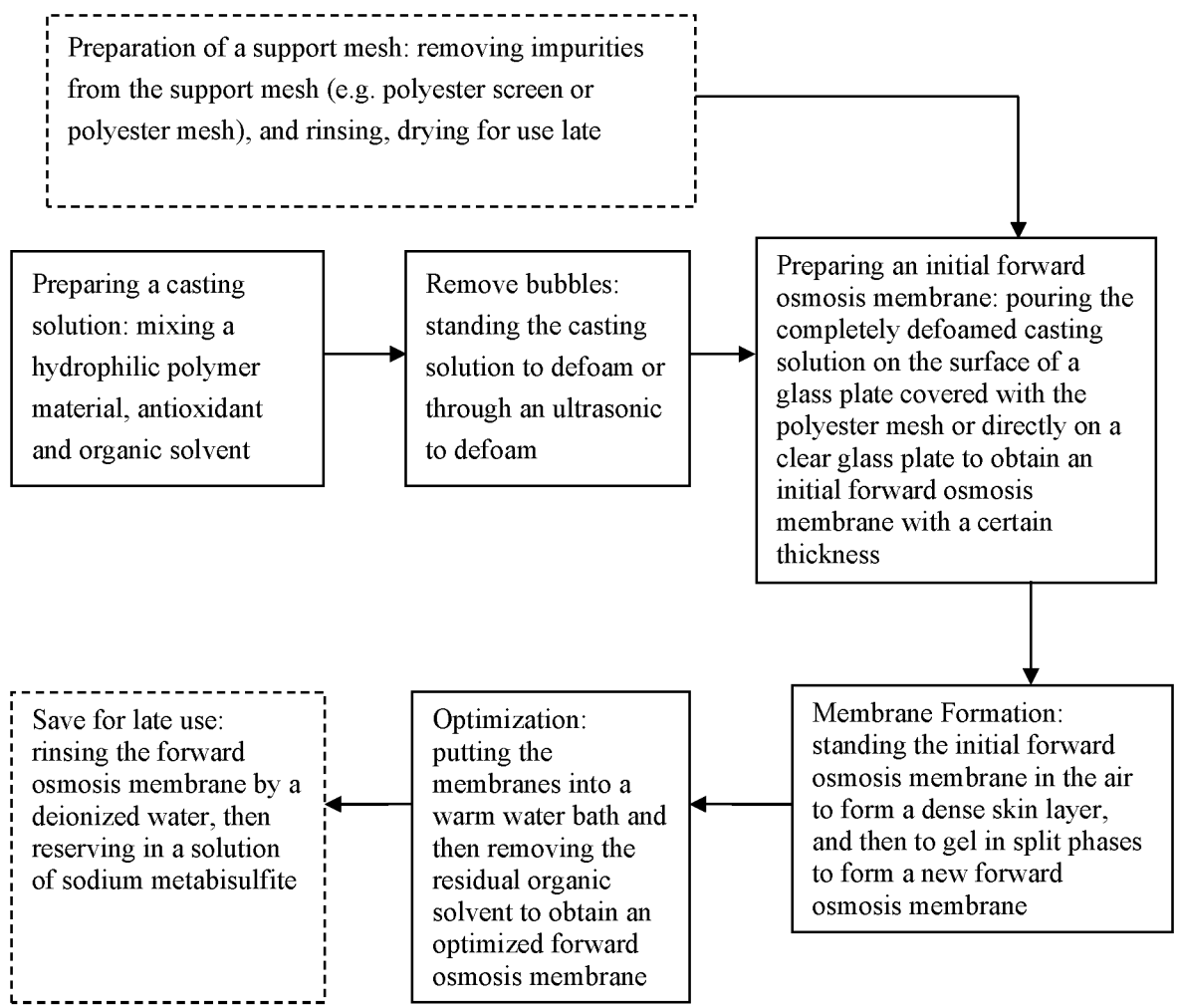

FORWARD OSMOSIS MEMBRANE AND METHOD OF PREPARING SAME

CROSS-REFERENCE TO RELATED APPLICATIONS

This application claims priority to Chinese Patent Application No. 202111056457.0, filed on Sep. 9, 2021, the entire disclosure of which is hereby incorporated by reference in its entirety.

TECHNICAL FIELD

This invention relates to macromolecule separation membrane field and its methods of preparing, and more specifically to an oxidation-resistant forward osmosis membrane and preparation method thereof.

BACKGROUND

The forward osmosis process is a process that using the osmotic pressure gradient between the draw solution and the feed solution as the driving force extracts water from the feed solution side with lower osmosis pressure pass through the selectively osmosis membrane and then self-diffuse into the draw solution side with higher osmosis pressure. This process does not require external pressure and energy.

Different from pressure-driven membrane separation processes, such as ultrafiltration, nanofiltration, and reverse osmosis, forward osmosis can operate at low or even non-pressure. Hence, its operation energy consumption is low. Under low pressure operation, the cake layer formed due to non-pressure has the characteristics of low fouling membrane. And in the case of enough osmotic pressure difference, it can have high water recovery ratio do not achieved by the conventional separation membrane.

Based on the above characters of forward osmosis, forward osmosis technology has been rapidly developed as a new membrane separation technology in recent years. Meanwhile, it has also become research hotspots of domestic and foreign researchers. It has been broadly applied in the industries of food, pharmacy, energy etc. In many areas, especially in desalination of seawater, drinking water treatment and wastewater treatment, it has demonstrated great prospects.

An ideal forward osmosis should have great hydrophilic, high flux, high salt rejection rate and high contamination resistance at the same time. These directions are the hot research directions in this field in recent years. At present, in this industry, it's commonly believed that the cellulose acetate forward osmosis membrane has stronger oxidative resistance than aromatic series polyamide compound membranes. Using cellulose acetate as the materials of forward osmosis membrane has formed the mainstream of the research and manufacturing in this industry, such Chinese Patent No. 201410050442.7, which discloses an asymmetric cellulose acetate forward osmosis membrane. The design of this patent aims to reduce the internal concentration polarization, and improve the forward osmosis flux and chlorine resistance. These researches aim at improve flux, salt rejection ratio, decrease the internal concentration difference and so on, while don't mention how to improve the oxidative resistance.

However, in practical application, especially after the catalytic oxidation process treatment, the strong oxidizing property of the waste water will still damage the membrane during operation, and the traditional methods which adding reductant at the front end are affected by the instability and fluctuation of quality and the quantity of the water. It can't ensure the absolute safety of the back-end membrane system. Currently, there is a lack of preparation of a forward osmosis membrane with strong oxidative resistance to deal with this dilemma. As what mentioned in Chinese patent No. 201410050442.7, the membrane manufactured according to its technology cannot be directly applied in the waste water with strong oxidizing property or other raw water, and the membrane damaged by the strong oxidative property of the raw water and shorten the service life of the membrane, and then increase the using cost of the entire membrane system.

SUMMARY

The first purpose of the present invention is to provide a forward osmosis membrane with strong oxidative resistance which can be used safely and stably under strong oxidizing environment.

Another purpose of the present invention is to provide a method to manufacture the forward osmosis membrane with strong oxidative resistance which can be used safely and stably under strong oxidizing environment.

To achieve the above purposes, embodiments of the present invention provide a forward osmosis membrane and method of preparing same.

The present invention related to a forward osmosis membrane. The forward osmosis membrane comprising a modified hydrophilic polymer membrane layer, the modified hydrophilic polymer membrane layer contains a hydrophilic polymer and an antioxidant; the modified hydrophilic polymer membrane layer is made by mixing the hydrophilic polymer material into a solvent system containing the antioxidant to obtain a casting solution, and performing processes of a film-forming process on the casting solution and a solvent removal process.

In a preferably embodiment, the hydrophilic polymer material constituting the hydrophilic polymer membrane layer includes at least one selected from the group consisting of Polyacrylonitrile, Polyacrylate, Polymethyl methacrylate, cellulose acetate, Cellulose triacetate, polyvinyl alcohol, Polyethylene oxide and Polyvinyl acetate; the antioxidant is hindered phenolic antioxidant; preferably, the antioxidant is selected at least one from the below materials:
2,6-Di-tert-butyl-4-methylphenol, pentaerythrityl tetrakis (3,5-di-tert-butyl-4-hydroxy) phenyl propionate and
1,3,5-Tris(3,5-di-tert-butyl-4-hydroxybenzyl)-1,3,5-triazine-2,4,6(1 h,3 h,5 h)-triketone).

In another preferably embodiment, in the casting solution, the ratio of the hydrophilic polymer and the antioxidant is 8-15:0.1-1(by weight); preferably ratio is 9-14:0.2-0.9 (by weight), further preferably is 10-13:0.2-0.7 (by weight), most further preferably is 8:0.2 (by weight) or 13:0.5 (by weight) or 13:0.2 or 11:0.3 (by weight).

In another preferably embodiment, also including support mesh with grids composed of hydrophilic polyester mesh or non-woven fabric, the hydrophilic polymer membrane layer is laminated on the support mesh; and when the support mesh is a polyester mesh, it has 30 μm-80 μm in thickness with mesh size of 100-200 mesh; preferably the thickness of the polyester mesh is 30 μm, 50 μm, 60 μm, 70 μm or 80 μm, and mesh size is 100 mesh, 120 mesh or 150 mesh; the forward osmosis membrane has 30 μm-150 μm thickness; preferably, the thickness of the forward osmosis membrane is 30 μm-100 μm; more preferably, the thickness of the forward osmosis membrane is 30 μm-80 μm; most preferably the thickness of the forward osmosis membrane is 30 μm, 50 μm, 60 μm or 70 μm. In another embodiment, the hydrophilic polymer membrane layer is laminated on and partially embedded into the support mesh.

In another preferably embodiment of the present invention, the mixtures of the casting solution (percentages are by weight): a hydrophilic polymer 8-15 wt. % and an antioxidant 0.1-1 wt. %. The solvent system contains 5-20 wt. % of acetone, 5-10 wt. % of methanol and 6-8 wt. % of lactic acid, and the remainder ingredient is 1,4-Dioxane. Preferably, the casting solution contains 9-14 wt. % of hydrophilic polymer and 0.2-0.9 wt. % of antioxidant (percentages are by weight); and the solvent system contains 7-20 wt. % of acetone, 5-8 wt. % of methanol and 6-8 wt. % of lactic acid, the remainder ingredient is 1,4-Dioxane; further more preferably, the casting solution contains 10-13 wt. % of the hydrophilic polymer and 0.3-0.7 wt. % of the antioxidant, the solvent system contains 10-20 wt. % of the acetone, 6-8 wt. % of the methanol and 6-8 wt. % of the lactic acid, the remainder ingredient is 1,4-Dioxane; further more preferably, the hydrophilic polymer is 13 wt. % of a cellulose triacetate and the percentage of the 1,4-Dioxane is 53.5 wt. %, 19 wt. % of the acetone, 8 wt. % of the methanol, 0.5 wt % of 2,6-Di-tert-butyl-4-methylphenol, and 6 wt. % of lactic acid; and further more preferably the hydrophilic polymer is 13 wt. % of the cellulose triacetate and the percentage of the 1,4-Dioxane is 53.8 wt. %, 19 wt. % of the acetone, 8 wt. % of the methanol and 0.2 wt % of 2,6-Di-tert-butyl-4-methylphenol, 6 wt. % of the lactic acid; and further more preferably the hydrophilic polymer is 11 wt. % of the cellulose triacetate and the percentage of the 1,4-Dioxane is 55.7 wt. %, 19 wt. % of the acetone, 8 wt. % of the methanol and 0.3 wt % of the 2,6-Di-tert-butyl-4-methylphenol, and 6 wt. % lactic acid.

According to the another purpose of the invention, the present invention further provides a method for preparing a forward osmosis membrane with modified hydrophilic polymer forward osmosis membrane, comprising:
(a) preparing for a casting solution: mixing a hydrophilic polymer material, antioxidant and water soluble organic solvent system to obtain a casting solution;
(b) coating the casting solution on the surface of a glass board covered with a hydrophilic support mesh with grids or a smooth glass board to obtain an initial forward osmosis membrane;
(c) treating the external layer of the initial forward osmosis membrane, removing the solvent to form a dense skin layer on the external layer to obtain a second initial forward osmosis membrane;
(d) performing phase separation film formation or interfacial film formation with the second initial forward osmosis membrane to obtain the forward osmosis membrane.

Thereof, further including steps as follows:
(a-1) defoaming or removing bubbles from the casting solution prepared in the step (a);
the step (b) further including: coating the casting solution removed bubbles which prepared by step (a-1) on the surface of the glass plate covered by hydrophilic support mesh or smooth glass plate, using a film scraper machine to form an initial forward osmosis membrane with a certain thickness;
the treatment of the external layer and removal solvent in the step (c), including standing the initial forward osmosis membrane in the air to make the solvent volatilize and form the dense skin layer on the external layer;
in the step (d), through immersing the second initial forward osmosis membrane into a deionized water to make it gel and split phase to form a membrane;
(e) immersing the forward osmosis membrane obtained by step (d) into a deionized water to remove the residual organic solvent;
(f) taking out the forward osmosis membrane and rising it with a deionized water, and then saving it in a sodium metabisulfite solution for later use.

Thereof, the materials of the hydrophilic support mesh can be polyester screens or polyester meshes or non-woven fabrics. When the support mesh is a polyester mesh made of polyester screens, it has 30 μm-80 μm in thickness with mesh size of 100-200 mesh; preferably the thickness is 30 μm, 50 μm, 60 μm, 70 μm or 80 μm, and mesh size is 100 mesh, 120 mesh or 150 mesh; the hydrophilic polymer material constituting the hydrophilic polymer membrane layer is selected one of from the group consisting of polyacrylonitrile (PAN), polyacrylate(PA), polymethyl methacrylate, cellulose acetate, cellulose triacetate, polyvinyl alcohol, poly(ethylene oxide), polyvinyl acetate and combinations thereof, the antioxidant is hindered phenolic antioxidant. The solvent system is a mixture of the following: 1,4-Dioxane, acetone, methanol and lactic acid and other similar solvents; the hindered phenolic antioxidant is selected from the group consisting of 2,6-Di-tert-butyl-4-methylphenol, Pentaerythritol tetrakis (3,5-di-tert-butyl-4-hydroxy) phenylpropionate, 1,3,5-Tris (3,5-di-tert-butyl-4-hydroxybenzyl)-1,3,5-triazine-2,4,6(1 h,3 h,5 h)-trione, and combinations thereof.

Thereof, the casting solution comprises from 8% to 15% (by weight) of a hydrophilic polymer and from 0.1% to 1% (by weight) of an antioxidant; preferably the hydrophilic polymer is 9-14 wt. % and the antioxidant is 0.2-0.9 wt. %; further preferably the hydrophilic polymer is 10-13 wt. % and the antioxidant is 0.2-0.7 wt. %; more preferably the hydrophilic polymer is 8 wt. % and the antioxidant is 0.2 wt. %; or even more preferably the hydrophilic polymer is 13 wt. % and the antioxidant is 0.5 wt. % or 0.2 wt. %; and or more preferably the hydrophilic polymer is 11 wt. % and the antioxidant is 0.3 wt. %.

Thereof the solvent system formulation and the corresponding mass proportion among the casting solution is as follows: 5-20 wt. % of a acetone, 5-10 wt. % of a methanol, 6-8 wt. % of a lactic acid, the remainder is 1,4-Dioxane; preferably 7-20 wt. % of the acetone, 5-8 wt. % of the methanol, 6-8 wt. % of the Lactic acid, the remainder is 1,4-Dioxane; further preferably 10-20 wt. % of the acetone, 6-8 wt. % of the methanol, 6-8 wt. % of the lactic acid, the remainder is 1,4-Dioxane; further preferably 19 wt. % of the acetone, 8 wt. % of the methanol, 6% of the lactic acid, and the remainder is 1,4-Dioxane.

Thereof, the hydrophilic support mesh is a polyester mesh, having a thickness of 30 μm or 50 μm, or 70 μm, and with a mesh size of 100 mesh, 120 mesh or 150 mesh, used after a pre-cleaning treatment. The pre-cleaning treatment comprises: soaking the polyester mesh respectively in a solution with 10% (by volume) of sodium hydroxide and a solution with 2% (by volume) of hydrochloric acid for one hour to remove the impurities adsorbed on the surface and then rinsing with a deionized water, then drying for the next step use. The thickness of the initial forward osmotic membrane prepared by the film scraper machine is from 30 μm to 150 μm, preferably from 30 μm to 100 μm, further preferably from 30 μm to 80 μm, most preferably 30 μm, 50 μm, 60 unm or 70 μm.

Thereof, in the step (a), the mixing condition is to stir the mixtures under a temperature of 30-50° C. for 12-48 hours to make the mixtures evenly mixed; preferably condition is to stir under a temperature of 40-50° C. for 12-32 hours; more preferably under a temperature of 40° C. and for 24 hours. The defoaming method is to keep standing in air for 12-36 hours to achieve fully defoaming or through an assistance of a ultrasonic to defoam; preferably, standing in air for 24 hours; the condition of standing in air is under an environment not be higher than 25° C. temperature and not be lower than 90% humidity, the standing time is from 30 seconds to 90 seconds to form the dense skin layer; further preferably under a temperature of 25° C. and a 90% humidity, with standing 30-60 seconds.

Thereof, in the step (e), before soaking the membrane into the deionized water, heat treating the membrane into a water bath at approximately 40-50° C. water for 5-20 minutes; the soaking time in the deionized water is 12-36 hours to remove the residuals of the organic solvents; preferably the heat treating into water bath at 50° C. for 15 minutes and soaking in the deionized water for 24 hours; in the step (f), the concentration of the sodium metabisulfite solution is between 0.5-2% (by volume).

The inventive forward osmosis membrane can be applied in the following areas: highly oxidizing wastewater treatment, water purifying, food and medicine processing, filtering and purifying.

In the inventive forward osmosis membrane and the method of preparing thereof, the forward osmosis membrane provided in the present invention is a modified membrane, which has a strong oxidation resistance performance by mixing the antioxidant especially adding the hindered phenolic antioxidant into the hydrophilic polymer layer. Therefore, a new kind of forward osmosis membrane with strong oxidation resistance is provided in the present invention, can perform safely and stably under the environment with relative strong oxidation.

At the meantime, in an embodiment of the present invention, the high hydrophilic polymer layer with high hydrophilic performance formed on non-woven fabric or polyester mesh improves the performances of the water penetration, water flux and salt rejection; and the antioxidant especially the hindered phenolic antioxidant (like 2,6-Di-tert-butyl-4-methylphenol) mixed into the hydrophilic polymer membrane layer ensures the oxidation resistance and chemical tolerance, and effectively reduces the oxidation restriction of a raw water, and reduces the input of reductants at pretreatment stage, thereby reducing the operation cost, improving the operation stability of the forward osmosis membrane and the efficiency of purifying and separating water, extending the usage life of the forward osmosis membrane, and decreasing cost for the use of the entire forward osmosis membrane system.

Meanwhile, the inventive preparation method of the forward osmosis membrane including forming a hydrophilic polymer membrane layer with oxidation resistance under optimized conditions not only has high membrane flux, high salt rejection rate, but also has high resistance to oxidation, and reduces the limitation of oxidizing property of a raw water entering the membrane, improves the operation stability of the forward osmosis membrane, thereby improving the efficiency of purifying and separating water, prolonging the service life of the forward osmosis membrane, and reducing the cost for the use of the entire osmosis membrane system.

BRIEF DESCRIPTION OF DRAWINGS

The FIGURE shows a process flow diagram of making the inventive forward osmosis membrane.

DESCRIPTION OF EMBODIMENTS

In order to further implicate the technique means and effects adopted by the present invention to achieve the predetermined purposes, the following in conjunction with the drawings and preferred embodiments, the forward osmosis membrane proposed according to the present invention and its preparation method, including embodiments, structure, preparation methods, features and efficacy are described below. The embodiments are provided in the application aim at further descript the present invention, but the described embodiments are only used to illustrate the present invention and not to limit the present invention.

The FIGURE shows an illustrative example of a process for preparing a forward osmosis membrane of the present invention, the detailed production technique procedures are as follows:

(1) Pre-preparing a support mesh: removing impurities from the polyester mesh, and rinsing well, then drying for late use. Whether to the pre-preparation of a polyester mesh depends on the needs.

(2) Preparing a casting solution: mixing a hydrophilic polymer material, antioxidant and organic solvent system fully well. Further preferably, in an embodiment of the present invention adding a hydrophilic polymer material, hindered phenol antioxidant into a water soluble organic solvent system solution, then stirring the mixtures under 30° C.-50° C. temperature for 12-48 hours to obtain homogeneous casting solution;

(3) Defoaming or removing the bubbles: standing the casting solution obtained from the step (2) for 12-36 hours to defoam thoroughly or through an assistance of an ultrasonic to defoam;

(4) Preparing an initial forward osmosis membrane: pouring the completely defoamed casting solution on the surface of a glass plate covered with the pretreated clean polyester mesh or directly on the surface of a clear glass plate, and scraping by a film scraper machine to form the initial forward osmosis membrane with a certain thickness;

(5) Membrane formation: standing the initial forward osmosis membrane obtained from the step (4) in air under a certain temperature and humidity for seconds to form a dense skin layer, then immersing the membrane with the dense skin layer into a deionized water to gel in split phases to form a new forward osmosis membrane; preferably, the air temperature is not higher 25° C. and humidity equals or above 90%, standing in air for 30-90 seconds;

(6) Optimization: putting the forward osmosis membrane obtained from the step (5) into hot water bath (40-50° C.) for 5-20 minutes, and then soaking in a deionized water for 24 hours to remove the residual organic solvent to obtain an optimized forward osmosis membrane;

(7) Save for late use: taking out the optimized forward osmosis membrane prepared by the step (6), rinsing by a deionized water, and then reserving in a solution of 0.5-2% sodium metabisulfite by volume.

Embodiment 1

(1) Soaking a polyester mesh (30 μm thick, 200 mesh) respectively into a solution with 2% (by volume) hydrochloric acid, and a solution with 10% (by volume) sodium hydroxide for one hour to remove the impurities adsorbed on the surface, and then rinsing with a deionized water, then drying for use in next step use;

(2) Adding a 13 wt. % (by weight) cellulose triacetate into a mixed solution including 53.5 wt. % (by weight) 1,4-Dioxane, 19 wt. % acetone, 8 wt. % methanol, 0.5 wt. % 2,6-Di-tert-butyl-4-methylphenol and 6% lactic acid, stirring at 40° C. for 24 hours to obtain a homogeneous casting solution;

(3) Standing the casting solution obtained from the step (2) for 24 hours to defoam thoroughly or through assistance from ultrasonic to defoam;

(4) Pouring the completely defoamed casting solution on a surface of a glass plate covered with polyester mesh (thickness 30 μm), and scraping by a film scraper machine to form an initial forward osmosis membrane with thickness 50 μm;

(5) Standing the initial forward osmosis membrane obtained from the step (4) in air under the temperature of 25° C. and humidity 90% for 60 seconds to form a dense skin layer, and then, immersing the membrane with the dense skin layer into a deionized water to gel in split phases to form a new forward osmosis membrane;

(6) Putting the forward osmosis membrane obtained from the step (5) into hot water bath (40-50° C.) for 5-15 minutes, and then soaking the forward osmosis membrane into a deionized water for 24 hours to remove the residual organic solvent to obtain an optimized forward osmosis membrane.

The Performances of the Forward Osmosis Membrane:

The forward osmosis membrane produced in the above procedures having a thickness of 50 μm, when using a 0.5 mol/L sodium chloride as a draw solution, and using a solution having ORP value of +800 mv and containing 0.01 mol/L magnesium sulfate and hydrogen peroxide as a feed solution, the membrane flux can reach 11.5 L/(m$^2$*h), the rejection of the magnesium sulfate is above 98%. The performances of the forward osmosis membrane did not degrade after soaking in the feed solution having ORP value +800 mv and containing the hydrogen peroxide for 30 days. The detailed performances test is shown in table 1.

Embodiment 2

(1) Adding a 13 wt. % (by weight) cellulose triacetate into a mixed solution including 53.8 wt. % (by weight) 1,4-Dioxane, 19 wt. % (by weight) acetone, 8 wt. % (by weight) methanol, 0.2 wt. % (by weight) 2,6-Di-tert-butyl-4-methylphenol and 6% (by weight) lactic acid, stirring at 40° C. for 24 hours to obtain a homogeneous casting solution;

(2) Standing the casting solution obtained from the step (1) for 24 hours to defoam thoroughly or through an assistance from ultrasonic to defoam;

(3) Pouring the completely defoamed casting solution over a cleaned glass plate, and scraping by a film scraper machine to form an initial forward osmosis membrane with thickness 50 μm;

(4) Standing the initial forward osmosis membrane obtained from the above step (3) in the air under the temperature of 25° C. and humidity 90% for 60 seconds to form a dense skin layer, and then immersing the membrane with the dense skin layer into a deionized water to gel in split phases to form a new forward osmosis membrane;

(5) Putting the forward osmosis membrane obtained from the step (4) into a warm water bath (40-50° C.) for 5-15 minutes, and then soaking the forward osmosis membrane in a deionized water for 24 hours to remove the residual organic solvent to obtained an optimized forward osmosis membrane.

The Performances of the Forward Osmosis Membrane:

The forward osmosis membrane produced in the above procedures has a thickness of 50 μm, when using a 0.5 mol/L sodium chloride as a draw solution, and using a solution having ORP value of +800 mv and containing 0.01 mol/L magnesium sulfate and hydrogen peroxide as a feed solution, the membrane flux can reach 11.2 L/(m$^2$*h), the rejection of the magnesium sulfate is above 98%. The performances of the forward osmosis membrane did not degrade after soaking in the feed solution having ORP value +800 mv and containing the hydrogen peroxide for 30 days. The detailed performances test is shown in table 1.

Embodiment 3

(1) Adding a 13 wt. % (by weight) cellulose triacetate into a mixed solution including 53.8 wt. % (by weight) 1,4-Dioxane, 19 wt. % (by weight) acetone, 8 wt. % (by weight) methanol, 0.2 wt. % (by weight) pentaerythrityl tetrakis (3,5-di-tert-butyl-4-hydroxy) phenyl propionate and 6% (by weight) lactic acid to stir at 40° C. for 24 hours to obtain a homogeneous casting solution;

(2) Standing the casting solution obtained from the step (1) for 24 hours to defoam thoroughly or through an assistance from ultrasonic to defoam;

(3) Pouring the completely defoamed casting solution over a cleaned glass plate, and scraping by a film scraper machine to form an initial forward osmosis membrane with thickness 50 μm;

(4) Standing the initial forward osmosis membrane obtained from the above step (3) in the air under the temperature of 25° C. and humidity 90% for 60 seconds to form a dense skin layer, and then immersing the membrane with the dense skin layer into a deionized water to gel in split phases to form a new forward osmosis membrane;

(5) Putting the forward osmosis membrane obtained from the step (5) into a hot water bath (40-50° C.) for 5-15 minutes, and then soaking the forward osmosis membrane in a deionized water for 24 hours to remove the residual organic solvent to obtained an optimized forward osmosis membrane;

The Performances of the Forward Osmosis Membrane:

The forward osmosis membrane produced in the above procedures has a thickness of 50 μm, when using a 0.5 mol/L sodium chloride as a draw solution, and using a solution having ORP value of +800 mv and containing 0.01 mol/L magnesium sulfate and hydrogen peroxide as a feed solution, the membrane flux can reach 11.3 L/(m$^2$*h), the rejection of the magnesium sulfate is above 98%. The performances of the forward osmosis membrane did not degrade after soaking in the feed solution having ORP value +800 mv and containing the hydrogen peroxide for 30 days. The detailed performances test is shown in table 1.

Embodiment 4

(1) Adding a 11 wt. % (by weight) cellulose triacetate into a mixed solution including 55.7 wt. % (by weight) 1,4-Dioxane, 19 wt. % (by weight) acetone, 8 wt. % (by weight) methanol, 0.3 wt. % (by weight) 2,6-Di-tert-butyl-4-methylphenol and 6% (by weight) lactic acid, stirring at 40° C. for 24 hours to obtain a homogeneous casting solution;

(2) Standing the casting solution obtained from the step (1) in for 24 hours to defoam thoroughly or through an assistance from ultrasonic to defoam;

(3) Pouring the completely defoamed casting solution over a cleaned glass plate, and scraping by a film scraper to form an initial forward osmosis membrane with thickness 70 μm;

(4) Standing the initial forward osmosis membrane obtained from the above step (3) in the air under the temperature of 25° C. and humidity 90% for 60 seconds to form a dense skin layer, and then immersing the membrane with the dense skin layer into a deionized water to gel in split phases to form a new forward osmosis membrane;

(5) Putting the forward osmosis membrane obtained from the step (4) into a warm water bath 50° C. for 15 minutes, and then soaking the forward osmosis membrane in a deionized water for 24 hours to remove the residual organic solvent to obtain an optimized forward osmosis membrane.

The Performances of the Forward Osmosis Membrane:

The forward osmosis membrane produced in the above procedures has a thickness of 70 μm, when using a 0.5 mol/L sodium chloride as a draw solution, and using a solution having ORP value of +800 mv and containing 0.01 mol/L magnesium sulfate and hydrogen peroxide as a feed solution, the membrane flux can reach 12.5 L/(m$^2$*h), the rejection of the magnesium sulfate is above 98%. The performances of the forward osmosis membrane did not degrade after soaking in the feed solution having ORP value +800 mv and containing the hydrogen peroxide for 30 days. The detailed performances test is shown in table 1.

Table 1 shows an illustration of using a solution with 0.5 mol/L sodium chloride as a draw solution, a 0.01 mol/L magnesium sulfate contained hydrogen peroxide solution (ORP+800 mv) as a feed solution to evaluate the performances of the forward osmosis membrane provided by the embodiments.

| Items | Membrane thickness/ Polyester mesh | Membrane Flux Day 1 | Rejection salt Day 1 | Membrane Flux Day 10 | Rejection salt Day 10 | Membrane Flux Day 20 | Rejection salt Day 20 | Membrane Flux Day 30 | Rejection salt Day 30 |
|---|---|---|---|---|---|---|---|---|---|
| Emb. 1 | 50/30 | 11.5 L/(m²*h) | 98.5% | 11.5 L/(m²*h) | 98.4% | 11.6 L/(m²*h) | 98.3% | 11.6 L/(m²*h) | 98.3% |
| Emb. 2 | 50/ | 11.2 L/(m²*h) | 98.6% | 11.3 L/(m²*h) | 98.5% | 11.3 L/(m²*h) | 98.5% | 11.4 L/(m²*h) | 98.1% |
| Emb. 3 | 50/ | 11.3 L/(m²*h) | 98.4% | 11.5 L/(m²*h) | 98.2% | 11.6 L/(m²*h) | 98.2% | 11.7 L/(m²*h) | 98.1% |
| Emb. 4 | 70/ | 12.5. (m²*h) | 98.2% | 12.5 L/(m²*h) | 98.1% | 12.6 L (m²*h) | 98.0% | 12.7 L/(m²*h) | 98.0% |

In the table 1, it shows clearly that the forward osmosis membrane of the present invention added with antioxidant have super strong oxidation resistance, and the performances of the membrane is not affected even after 30 days of immersion in a strong oxygen property water. While for the existing forward osmosis membrane composed of cellulose triacetate and other existing available forward osmosis membrane products, its oxidation resistance is not strong, and the membranes' performance declines more severely as the soaking time is longer.

In the present invention, the concentration of sodium hydroxide, hydrochloric acid and sodium metabisulfite are computed by volume.

In the present invention, the wt. % means percentage by weight.

In the inventive forward osmosis membrane and the method of preparing same, the forward osmosis membrane is a modified membrane, which obtains strong oxidation resistance capabilities by adding antioxidant especially hindered phenolic antioxidant into hydrophilic polymer layer. Therefore the inventive forward osmosis membrane with oxidation resistance performance can be used safely and stably under strong oxidizing condition.

In the specification, the invention has been described with reference to specific embodiments thereof. However, it is very obviously that there are many various modifications and changes which can be made without deviated or departure from the spirit and scope of the invention. Accordingly, the specification and drawings presented in the invention are to descript and illustrate the invention rather than to limit or restrict the invention.

What is claimed is:

1. A forward osmosis membrane, comprising a modified hydrophilic polymer membrane layer, the hydrophilic polymer membrane layer contains a hydrophilic polymer and an antioxidant; the hydrophilic polymer membrane layer is made by mixing a hydrophilic polymer material into a solvent system containing the antioxidant to obtain a casting solution and performing processes of film-forming for casting solution, removing solvent; the hydrophilic polymer material in the casting solution is a cellulose triacetate with 11-13 wt. % by weight; the antioxidant is hindered phenolic antioxidant 2-6-Di-tert-butyl-4-methylphenol with 0.2-0.7 wt. % by weight; when using a 0.5 mol/L sodium chloride as a draw solution, and using a solution having ORP value of +800 mv and containing 0.01 mol/L magnesium sulfate and hydrogen peroxide as a feed solution, membrane flux and salt rejection of the forward osmosis membrane do not degrade after soaking in the feed solution for 30 days.

2. The forward osmosis membrane of claim 1, wherein the antioxidant is 0.3-0.5 wt. % by weight among the casting solution.

3. The forward osmosis membrane of claim 1, further comprising a support mesh with grids composed of hydrophilic polyester mesh or non-woven fabric, the hydrophilic polymer membrane layer is laminated on the support mesh; and when the support mesh is the hydrophilic polyester mesh, the support mesh has 30 μm-80 μm in thickness with mesh size of 100-200 mesh; the forward osmosis membrane has 30 μm-150 μm thickness.

4. The forward osmosis membrane of claim 1, wherein in the casting solution, the solvent system comprises a 5-20 wt. % acetone by weight, a 5-10 wt. % methanol by weight and a 6-8 wt. % lactic acid by weight, and a remainder of the solvent system is a 1,4-Dioxane.

5. A method of preparing for a forward osmosis membrane, wherein the forward osmosis membrane comprises a modified hydrophilic polyester membrane layer, the method comprising:
(a) preparing a casting solution: mixing a hydrophilic polyester material, an antioxidant, and a water soluble organic solvent system together to obtain the casting solution;
(b) coating the casting solution on a surface of a glass plate covered with a polyester mesh or directly on a clear glass plate to obtain an initial forward osmosis membrane;
(c) treating an external layer of the initial forward osmosis membrane, and removing solvent to form a dense skin layer on the external layer to obtain a second initial forward osmosis membrane;
(d) performing a phase separation film formation or interfacial film formation with the second initial forward osmosis membrane to obtain the forward osmosis membrane;
wherein a hydrophilic polymer material in the casting solution is 11-13 wt. % cellulose triacetate by weight;

the antioxidant is hindered phenolic antioxidant 2-6-Di-tert-butyl-4-methylphenol with 0.2-0.7 wt. % by weight;

when using a 0.5 mol/L sodium chloride as a draw solution, and using a solution having ORP value of +800 mv and containing 0.01 mol/L magnesium sulfate and hydrogen peroxide as a feed solution, membrane flux and salt rejection of the forward osmosis membrane do not degrade after soaking in the feed solution for 30 days.

6. The method of preparing for a forward osmosis membrane of claim 5, further comprising:

(a-1) defoaming the casting solution prepared in the step (a);

the step (b) further including:

pouring the casting solution after being defoamed by removing bubbles, which is prepared in step (a-1), on the surface of the glass plate covered by hydrophilic support mesh or directly on a surface of the clear glass plate, and using a film scraper machine to form the initial forward osmosis membrane with a certain thickness;

the step (c) of treating the external layer and removing the solvent further including:

standing the initial forward osmosis membrane in the air to make the solvent volatilize and form the dense skin layer on the external layer;

further in the step (d), immersing the second initial forward osmosis membrane into a first deionized water to make the second initial forward osmosis membrane in a gel and split phase to form the forward osmosis membrane;

(e) immersing the forward osmosis membrane obtained by the step (d) into a second deionized water to remove residual organic solvents;

(f) taking out the forward osmosis membrane and rinsing the forward osmosis membrane with a third deionized water, saving the rinsed forward osmosis membrane in a sodium metabisulfite solution for later use.

7. The method of preparing for a forward osmosis membrane of claim 6, wherein the hydrophilic support mesh is composed of hydrophilic polyester mesh or non-woven fabric; and when the hydrophilic support mesh is the hydrophilic polyester mesh, the hydrophilic support mesh has 30 μm-80 μm in thickness with mesh size of 100-200 mesh; the water soluble organic solvent system is a mixture solution of 1,4-dioxane, acetone, methanol and lactic acid.

8. The method of preparing for a forward osmosis membrane of claim 5, wherein the antioxidant is 0.3-0.5 wt. % by weight.

9. The method of preparing for a forward osmosis membrane of claim 5, wherein a solvent system formulation and a corresponding mass proportion among the casting solution are as follows: 5-20 wt. % of acetone mass, 5-10 wt. % of methanol, 6-8 wt. % of lactic acid, a remainder of the casting solution is 1,4-Dioxane.

10. The method of preparing for a forward osmosis membrane of claim 7, wherein the hydrophilic support mesh is a polyester mesh having thickness of 30 μm, 50 μm, 60 μm or 70 μm and mesh size of 100 mesh or 150 mesh, used after a pre-cleaning treatment; the pre-cleaning treatment comprises: soaking the polyester mesh respectively in a solution with 10% sodium hydroxide by volume and a solution with 2% hydrochloric acid by volume for one hour to remove impurities adsorbed on the surface of the glass plate and then rinsing with a fourth deionized water, then drying for next step use; the thickness of the initial forward osmotic membrane prepared by the film scraper machine is from 30 μm to 150 μm.

11. The method of preparing for a forward osmosis membrane of claim 6, wherein in the step (a), a mixing condition is to stir mixtures under a temperature of 30-50° C. for 12-48 hours to make the mixtures evenly mixed; the (a-1) defoaming step is to keep standing in air for 12-36 hours to fully defoam or to defoam through an assistance of ultrasound; a condition of standing in air is under an environment with a temperature not being higher than 25° C., and with a humidity not being lower than 90%, a standing time to form the dense skin layer in the step (c) is from 30 seconds to 90 seconds.

12. The method of preparing for a forward osmosis membrane of claim 6, wherein in the step (e), before soaking the membrane into the deionized water, heat treating the membrane into a warm water bath at 50° C. temperature for 15 minutes; a soaking time in the deionized water is 12-36 hours to remove the residual organic solvents; in the step (f), a concentration of the sodium metabisulfite solution is between 0.5-2% by volume.

* * * * *